United States Patent [19]

Spelman et al.

[11] Patent Number: 5,680,458

[45] Date of Patent: Oct. 21, 1997

[54] ROOT KEY COMPROMISE RECOVERY

[75] Inventors: Jeffrey F. Spelman, Duvall; Matthew W. Thomlinson, Bellvue, both of Wash.

[73] Assignee: Microsoft Corporation, Redmond, Wash.

[21] Appl. No.: 555,697

[22] Filed: Nov. 14, 1995

[51] Int. Cl.$^6$ ................................................ H04L 9/08
[52] U.S. Cl. ........................................ 380/21; 380/30
[58] Field of Search ............................ 380/21, 49, 48, 380/30

[56] References Cited

U.S. PATENT DOCUMENTS 4,799,258   1/1989   Davies ............................ 380/21
5,469,507  11/1995   Canetti et al. .................. 380/30
5,499,294   3/1996   Friedman ........................ 380/10

Primary Examiner—Thomas H. Tarcza
Assistant Examiner—Pinchus M. Laufer
Attorney, Agent, or Firm—Michaelson & Wallace; Peter L. Michaelson

[57] ABSTRACT

A method of recovering from a compromise of a root key which is the private key of a first public key-private key pair, the method including the steps of electronically sending out an emergency message indicating that the root key has been compromised and also containing a replacement key and a digital signature which was generated by using the root key; and publishing in an out-of-band channel a value V, wherein V is derived from the emergency message.

12 Claims, 2 Drawing Sheets

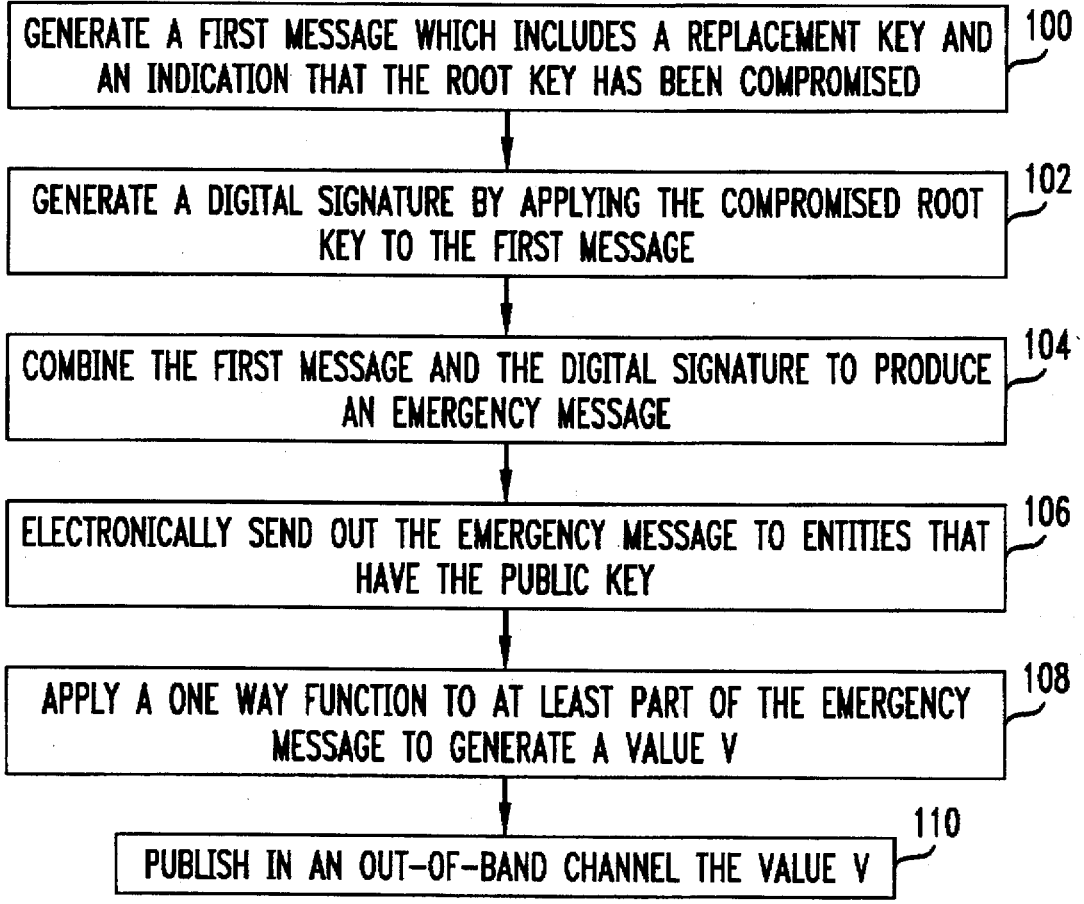

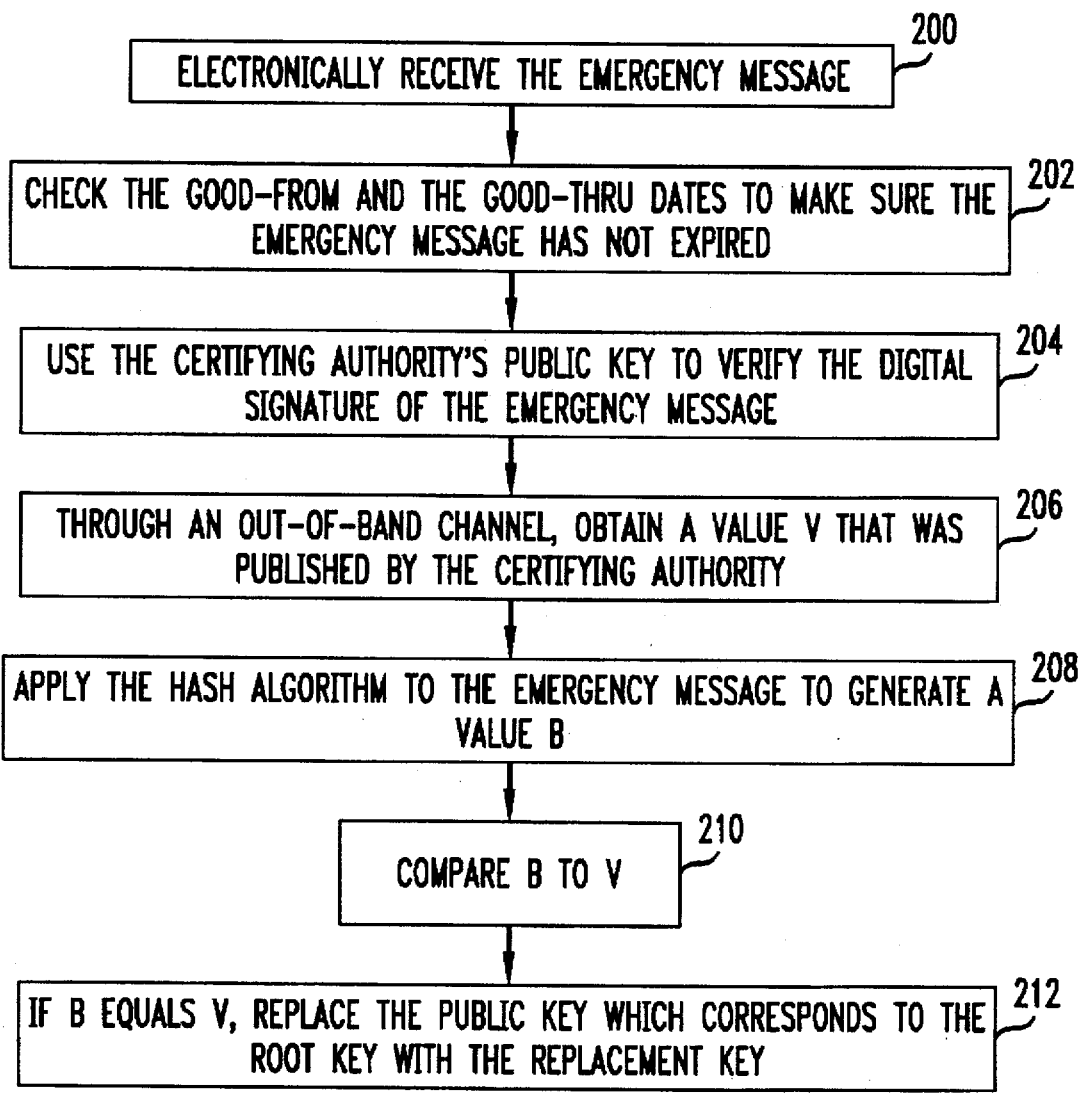
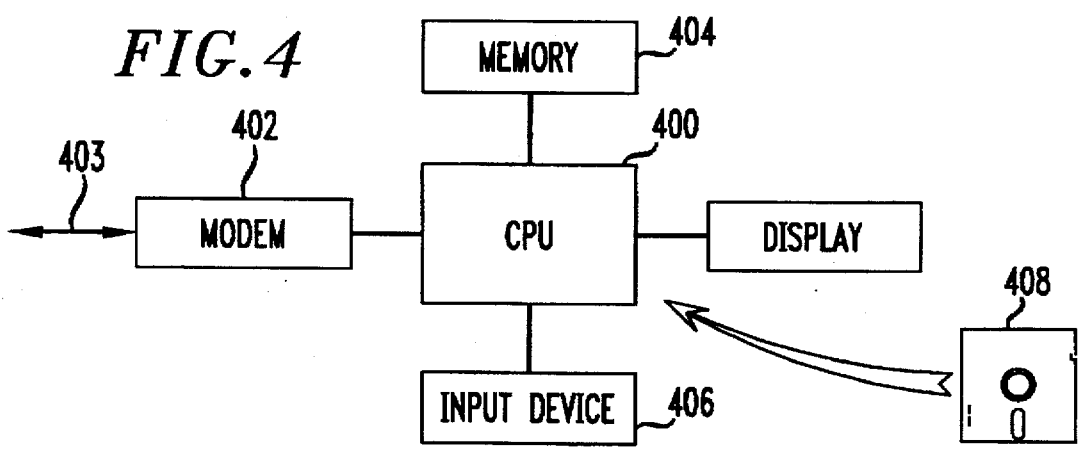

ROOT KEY COMPROMISE RECOVERY

BACKGROUND OF THE INVENTION

The invention relates generally to cryptography and more particularly to root key compromise recovery.

In cryptography various algorithms have been developed that are referred to as public key algorithms. They are very useful for signing and authenticating electronic documents.

In general, public key algorithms involve two keys, namely, a public key and a private key. The private key is held by the certifying authority and is kept secret; while the public key, as the name implies, is distributed to the public. The holder of the public key can use it to encrypt data that can be decrypted only by a person who holds the private key. Similarly, the holder of the private key also can use it to encrypt data that can then be decrypted only a person who holds the public key. Thus both keys provide a useful tool for encrypting documents so that they cannot be read by parties for whom the documents are not intended.

When the private key is used to encrypt data, the result is sometimes called a digital signature. It has the special characteristic that only the holder of the private key could have produced it. Thus, if the private key is kept secret, the recipient of a document with a digital signature can identify the source of the document by verifying the digital signature. Verifying the digital signature simply involves applying the public key to the digital signature to produce a data string and then comparing the data string to the document to which the signature was attached. If the data string is identical to the attached document, then the recipient can be confident that the document was indeed signed by the certifying authority and can trust the contents of the signed document.

Of course, this holds true only so long as the public has confidence that the private key has in fact remained private and is known only by the certifying authority. As soon as the key becomes compromised, the recipient of a signed document can no longer be sure that the document was signed by the certifying authority and not by a party which compromised the private key. If there is an authority above the certifying authority and which everybody trusts (which we shall refer to as a central authority), then the certifying authority whose key was compromised can select a new private key and distribute a replacement key with an attached certification of the central authority. Recipients of the replacement key will be able to trust that the new public key corresponds to the new private key because of the digital signature of the central authority.

But what if the private key of the central authority becomes compromised? And what if there is no authority above the central authority that everybody trusts? Then the problem of how to effectively and efficiently distribute the replacement key so that the public can trust as a valid key and not a key that is really owned by some entity attempting to subvert the system becomes a very difficult problem to solve.

SUMMARY OF THE INVENTION

In general, in one aspect, the invention is a method of replacing a root key, which is a private key of a public key-private key pair. The method includes the steps of electronically sending out a message indicating that the root key is being replaced and containing a replacement key and a digital signature which was generated by using the root key; and publishing in an out-of-band channel a value V, wherein V is derived from the message. The replacement key is the public key of another public key-private key pair which is replacing the first-mentioned public key-private key pair.

Preferred embodiments include the following features. The method includes the step of computing the value V by applying a one-way function to at least some part of the message. The method also incudes the step of concatenating the replacement key with an identifier to generate the message and the identifier identifies the message as a message which carries a replacement key. The step of generating the message further includes concatenating the replacement key (1) with a serial number that indicates which of a plurality of root keys is being replaced; (2) with a good-to date which indicates when the replacement key will expire; and (3) with a good-from date which indicates a time beyond which the replacement key will become active.

In general, in another aspect, the invention is a method of replacing a root key that is the private key of a public key-private key pair. The method includes the steps of generating a first message which includes a replacement key and an indication that the root key is being replaced; generating a digital signature by applying the root key to the first message; combining the first message and the digital signature to produce a second message; electronically sending out the second message; publishing in an out-of-band channel a value V that is derived from the second message.

In general, in still another aspect, the invention is a method of responding to a change of a root key that is the private key of a public key-private key pair. The method includes the steps of electronically receiving a message which indicates that the root key is being replaced and which also contains a replacement key and a digital signature that was generated by using the root key; using the public key corresponding to the root key to verify the digital signature of the message; obtaining through an out-of-band channel a value V that was derived from the message by applying an algorithm to at least some part of the message; applying the algorithm to the at least some part of the message to generate a value B; comparing B to V; and if B equals V, replacing the public key which corresponds to the root key with the replacement key.

In general, in yet another aspect, the invention is a method of recovering from a root key compromise including the steps of electronically sending out an emergency message, indicating that the root key has been compromised and also containing a replacement key and a digital signature which was generated by using the root key; and publishing in an out-of-band channel a value V that is derived from the emergency message.

In general, in still yet another aspect, the invention is a method of recovering from a root key compromise including the steps of: electronically receiving an emergency message indicating that the root key is being replaced and also containing a replacement key and a digital signature which was generated by using the root key; using the public key for the compromised root key to verify the digital signature of the emergency message; obtaining through an out-of-band channel a value V that was derived from the emergency message by applying an algorithm to at least some part of the emergency message; applying the algorithm to the emergency message to generate a value B; comparing B to V; and if B equals V, replacing the compromised public key with the replacement key.

In general, in another aspect, the invention is an apparatus for recovering from a compromise of a root key. The apparatus includes a digital processor; a communication interface connected to the digital processor and through which an emergency message is electronically received; memory storing the public key corresponding to the root key; and an input device through which a value V is entered into the digital processor, wherein V is obtained through an out-of-band channel and was generated by applying an algorithm to at least some part of the emergency message. The emergency message indicates that the root key has been compromised and also contains a replacement key and a digital signature which was generated by using the compromised root key. The digital processor is programmed to use the public key corresponding to the root key to verify the digital signature of the emergency message; to apply the algorithm to the emergency message to generate a value B; to compare B to V; and to replace the public key which corresponds to the root key with the replacement key, if B equals V.

In general, in still another aspect, the invention is a computer-readable medium storing a computer program for recovering from a compromise of a root key. The stored program includes computer readable instructions: (1) which cause the computer to retrieve from memory an emergency message which indicates that the root key has been compromised and which also contains a replacement key and a digital signature which was generated by using the compromised root key; (2) which cause the computer to use the public key corresponding to the root key to verify the digital signature of the emergency message; (3) which cause said computer to apply the algorithm to the emergency message to generate a value B; (4) which cause the computer to compare B to V; and (5) which cause the computer to replace the public key which corresponds to the root key with the replacement key, if B equals V.

Recovery from root key compromises is a serious, unsolved problem, plaguing public key cryptography. The invention allows a user to take advantage of the user's ability to receive keys electronically, without risk of falling to a spoofing attack from the compromiser of the key, and without laborious typing of the entire key into the system by hand, which could involve up to hundreds of hex digits. The invention, by using a one-way function to generate a verification code and by then taking advantage of existing out-of-band channels that are already available, allows for secure re-keying with the user typing only 15–20 hex digits. The much larger key can be received and entered electronically.

By using out-of-band authentication methods along with an emergency message, the user can get a great deal of confidence that both the message and the replacement root authentication key are legitimate.

With the invention, an intermediate entity (e.g. a merchant) can be notified that the root key has been compromised. Then, when the merchant sends some electronic communication to a consumer, that communication can also include the emergency message, which contains the new public key for the central authority, and a notification to the consumer that this is the new public key that is to be used. In this way, the central authority can rely on other entities to help distribute the emergency message and need not have the responsibility of individually notifying all affected parties.

Other advantages and features will become apparent from the following description of the preferred embodiment and from the claims.

BRIEF DESCRIPTION OF THE DRAWINGS

FIG. 1 shows the format of the emergency message;

FIG. 2 is a flow chart showing the actions performed by a central authority in carrying out a root key compromise recovery;

FIG. 3 is a flow chart showing the actions performed by a consumer in recovering from a root key compromise; and FIG. 4 is a block diagram of a computer system which performs the root key compromise recovery.

DESCRIPTION OF THE PREFERRED EMBODIMENTS

Emergency Message

In general, the invention involves using an in-band channel to distribute a key compromise emergency message which contains a new replacement key and using a different, out-of-band channel to publish a verification code which can be used by customers to verify the authenticity of the emergency message. By an in-band channel, we mean any channel of electronic communication that the parties use for carrying on their normal business with each other. These might include the Internet, computer links such as wide area networks, telephone lines, radio transmissions, or any one or more a large number of possibilities. By an out-of-band channel, we mean any other channel which enables one entity to communicate with the other entity. An out-of-band channel might only support unidirectional communications from the central authority, such as would be the case for publication in a newspaper. The out-of-band channel should have the characteristics that the recipient of the out-of-band communication will have high confidence that the message came from the central authority and not from some party masquerading as the central authority.

Referring to FIG. 1, an emergency message 10 includes an message identifier 12, a serial number 14, a replacement key 16, a Good-From date 18, a Good-Thru date 20, and a digital signature 22. Message identifier 12 identifies the message as an emergency message. Serial number 14, which may be optional, identifies the particular root key that has been compromised. This may be a necessary particularly if there is more than one private key-public key pair that is used by the central authority.

Replacement key 16 is the public key part of the new private key-public key pair that has been selected to replace the compromised root key of the prior private key-public key pair.

The two date fields containing Good-From date 18 and Good-Thru date 20 indicate the period of time for which the replacement key is valid. The Good-From date is particularly useful in the event that the central authority has a policy of periodically replacing its public key-private key pair as part of a program to assure the continuing security of its system. In that event, the central authority can transmit the emergency message prior to the actual change in key pairs, and the system at the user end will not implement the change until after the Good-From date. And, of course, the Good-Thru date 20 indicates when the key has expired. Thus, users will not accidentally use keys in old emergency messages.

Finally, the digital signature which the central authority attaches to the message is generated by using the compromised root key.

Central Authority Protocol

Referring to FIG. 2, when the central authority has an indication or believes that its root key has been compromised, it selects a new, replacement public key-private key pair and constructs an emergency message for distributing a replacement key to users (step 100). It constructs the emergency message by concatenating the above-described information including the replacement key to generate a packet of information. It then generates a digital signature for that packet of information (step 102) and appends the digital signature to the packet to produce the emergency message (step 104).

The central authority uses the compromised root key to generate the digital signature. The signature can be generated in any of several ways. One way is to simply employ any of a number of known digital signature algorithms using the root key. Another way is to first apply a one-way function to the packet of information to produce a more compact representation of that information and then use the digital signature algorithm with the root key.

Of course, if the latter approach is used, the same one-way function must be used by the recipient of the emergency message as part of its verification process. Thus, it is assumed that the one-way function is made publicly available or is a widely known one-way function.

Once the digital signature has been appended to produce the complete emergency message, the central authority broadcasts it to other users over in-band channels that it typically uses to send or receive business communications or over specially selected in-band channels that are accessible to the public (step 106).

The central authority also generates and distributes a verification code V which recipients of the emergency message may use to verify that the emergency message is legitimate. The verification code is generated by applying a one-way function or one-way hash function to the emergency message, or some part of the emergency message to generate a hash value (step 108). The one-way function may be either identical to or different from the one-way function that was used to generate the digital signature, assuming that one was used.

In either case, the central authority makes the one-way function f(x) publicly available. It should be understood that in practice, perfect one-way functions may not actually exist. That is, for all functions now believed to be one way functions, there may eventually be sufficient computing power or techniques for determining $x_1$ given $f(x_1)$. Thus, by the phrase one-way function, we mean to also include those functions for which it is very difficult, but not necessarily impossible, to compute $x_1$ by knowing $f(x_1)$.

In the described embodiment, the hash function is well known Secure Hash Algorithm (SHA). However, the one-way function(s) can be any one of a number of standard hash functions (e.g. MD5, SHA, etc.). For a description of SHA and other acceptable one-way hash functions, the reader is referred to the public literature relating to cryptography, e.g. *Applied Cryptography* by Bruce Schneier, published by John Wiley & Sons, Inc.

In addition, it should be further understood that one could use several one-way functions and concatenate them. There are a lot of one-way functions known in the art and typically, many of them are easy to compute and thus they can be implemented on a smart card.

After generating the verification code V, the central authority publishes it in a manner that assures its reliability, i.e., in a manner that assures recipients that it did indeed come from the central authority (step 110). This will involve disseminating V through some communication channel other than the channel that was used to send the emergency message (i.e., an out-of-band channel).

It is particularly desirable that the out-of-band channel be a channel that cannot be taken over or corrupted by any party that may have compromised the root key. The out-of-band channel might be a well-known (or hard-coded within a computer application) 800-number which the user can call and then verify the hash value over the phone. Or perhaps it might be a well known and trusted publication, such as a national newspaper or magazine, in which the verification value is published on a given page on a given date or range of dates. The verification through the out-of-band channel of the hash value V which the user produces by applying the one-way function to the emergency message gives the user a high degree of confidence that the emergency message is legitimate because an adversary would have to take over or collude with the out-of-band channel in order to produce a valid emergency message, which is very unlikely.

The advantage of the approach which we have described is that the emergency message can be disseminated by anybody. The central authority need not have immediate access to all of the numerous users who may need a replacement key. Rather, the central authority can rely on the initial recipients of the emergency message (e.g. merchants or vendors) to pass it on to other users (e.g. consumers). Indeed, there is an incentive for merchants to disseminate the emergency message to consumers since the public key of the central authority will typically be needed to authenticate information that will be exchanged during the commercial transactions occurring between the consumer and the merchant.

Public User Protocol

Referring to FIG. 3, the user electronically receives the emergency message either directly from the central authority or indirectly through other intermediaries (step 200). Upon receiving the emergency message and recognizing it to be an emergency message, the user checks the Good-From and Good-Thru dates within the message to make sure that the emergency message is current (step 202). Assuming that the message is current, the user then verifies the digital signature that is part of the emergency message (step 204). The users does this by applying a public key algorithm using the compromised root key. If there are multiple root keys that are being used by the central authority, the user identifies the relevant one of those keys by examining the serial number within the emergency message.

After determining that the emergency message is current and authenticating it, the user then obtains the verification value V from the out-of-band source (step 206). Then, the user applies the one-way function to the appropriate part or all of the emergency message to generate another value B (step 208) and compares this to the verification value V obtain from the out-of-band channel (step 210). If B equal V, this verifies that the emergency message was sent by the central authority and not by any party that has obtained the original root key without authority to have it. It is important for the user to generate B and to verify that it is a correct and legitimate value, since a compromised key will allow a rogue to send out his own emergency message in an attempt to take control of the system.

If the user verifies that V equals B, then the user replaces the old public key with the replacement key that is contained in the emergency message (step 212).

At any point in this procedure, if a test fails, then the user ignores the emergency message and continues using the original public key corresponding to the original root key. Of course, if the user determines that V does not equal B, then the user knows that it is very likely that the root key has been compromised but that the emergency message was an attack on the system by the party which compromised the root key.

It should be apparent that signing the emergency message with a compromised root key is, in fact, an important step even though the root key has been compromised. This signature acts as a first line of defense. It assures that not just anyone can put out an emergency message, disrupting the normal workings of the system. The signature means that the emergency message could have only one of two sources, namely, the system authority who has the root authentication key or the entity which has compromised the root authentication key. That greatly reduces the number of entities that could use an emergency message to subvert the system.

It should be recognized that the procedures for processing an emergency message can be performed automatically on behalf of the user by a computing device (e.g. a PC computer) on the user's end. Referring to FIG. 4, the computer typically includes a programmable digital processor 400 with a communications interface 402 (e.g. a modem) for receiving the emergency message over some communications link 403, e.g. the telephone lines. The computer also includes a memory 404, including both main memory and auxiliary memory, for storing the public keys that are needed by the user and for storing the program which use those keys including the program which processes the emergency message. The program which processes the emergency message might be loaded into the computer from other external computer readable media such as a computer disk 408. The computer also includes an input device 406 (e.g. a keyboard) which enables the user to enter the verification code that is retrieved from the out-of-band channel and a display device (e.g. video screen) which displays relevant information to the user.

The computer receives the emergency message over the communications link and is programmed to recognize it as an emergency message. It then performs the operations described above. This could be fully automated or it could require user control and input. In any event, assuming that the message proves to be current and passes the first test of its validity (i.e., the digital signature was generated by the compromised root key), the computer then notifies the user to enter a verification code to authenticate the new key. For example, the computer might display a dialog box on the screen that says "Go the NYTimes and enter the number that has been published on page x on such-and-such a date" or "Call 1-800-number and type in the number that is read to you." In other words, the computer requests input (i.e., the verification number or string) that can be obtained from a specified out-of-band communication.

If the verification code that the user enters verifies the emergency message, then the computer would replace the compromised key in memory with the new replacement key.

Though we have used a PC as an example, the computing device can be any of a large variety of electronic devices which include a digital processor including, for example, a PDI, a smart-card, a palm-top computer, or a more powerful workstation, just to name a few. In addition, the communications media over which the transfers of information take place can also be any of a large number of possibilities, including telephone lines, cable, the Internet, satellite transmissions, or radio transmissions, for example. In other words, it is not intended that the invention be limited with regard to either the types of devices that are used or the methods of communication that are employed.

It should of course also be understood that the computing devices include, either internally or externally, all of the memory that is required for the data and programs that are involved in implementing the protocols. Furthermore, they include whatever devices (e.g. a modem) that are required for them to communicate with other computing devices. In addition, the communications media over which the transfers of information take place can also be any of a large number of possibilities, including telephone lines, cable, the Internet, satellite transmissions, or radio transmissions, for example. In other words, it is not intended that the invention be limited with regard to either the types of devices that are used to implement the above-described protocols or the methods of communication that are employed.

Other embodiments are within the following claims.

What is claimed is:

1. A method of replacing a root key, said root key being the private key of a first public key-private key pair, said method comprising:

electronically sending out a message, said message indicating that the root key is being replaced, said message also containing a replacement key and a digital signature which was generated by using the root key, said replacement key being the public key of a second public key-private key pair which is replacing the first public key-private key pair; and publishing in an out-of-band channel a value V, wherein V is derived from the message.

2. The method of claim 1 further comprising computing the value V by applying a one-way function to at least some part of the message.

3. The method of claim 2 further comprising generating the message by concatenating the replacement key with an identifier, said identifier identifying the message as a message which carries a replacement key.

4. The method of claim 2 further comprising generating the message by concatenating the replacement key with a serial number, said serial number indicating which of a plurality of root keys is being replaced.

5. The method of claim 2 further comprising generating the message by concatenating the replacement key with a good-to date which indicates when the replacement key will expire.

6. The method of claim 2 further comprising generating the message by concatenating the replacement key with a good-from date which indicates a time beyond which the replacement key will become active.

7. A method of replacing a root key, said root key being the private key of a first public key-private key pair, said method comprising:

generating a first message which includes a replacement key and an indication that the root key is being replaced, said replacement key being the public key of a second public key-private key pair which is replacing the first public key-private key pair;

generating a digital signature by applying the root key to the first message;

combining the first message and the digital signature to produce a second message;

electronically sending out the second message;

publishing in an out-of-band channel a value V, wherein V is derived from the second message.

8. A method of responding to a change of a root key, said root key being the private key of a first public key-private key pair, said method comprising:

electronically receiving a message, said message indicating that the root key is being replaced, said message also containing a replacement key and a digital signature which was generated by using the root key, said replacement key being the public key of a second public key-private key pair which is replacing the first public key-private key pair;

using the public key corresponding to the root key to verify the digital signature of the message;

obtaining through an out-of-band channel a value V that was derived from the message by applying an algorithm to at least some part of the message;

applying the algorithm to said at least some part of the message to generate a value B;

comparing B to V; and if B equals V, replacing the public key which corresponds to the root key with the replacement key.

9. A method of recovering from a compromise of a root key, said root key being the private key of a first public key-private key pair, said method comprising:

electronically sending out an emergency message, said emergency message indicating that the root key has been compromised, said emergency message also containing a replacement key and a digital signature which was generated by using the root key, said replacement key being the public key of a second public key-private key pair which is replacing the first public key-private key pair; and publishing in an out-of-band channel a value V, wherein V is derived from the emergency message.

10. A method of recovering from a compromise of a root key, said root key being the private key of a first public key-private key pair, said method comprising:

electronically receiving an emergency message, said emergency message indicating that the root key is being replaced, said emergency message also containing a replacement key and a digital signature which was generated by using the root key, said replacement key being the public key of a second public key-private key pair which is replacing the first public key-private key pair;

using the public key of the first public key-private key pair to verify the digital signature of the emergency message;

obtaining through an out-of-band channel a value V that was derived from the emergency message by applying an algorithm to at least some part of the emergency message;

applying the algorithm to said at least some part of the emergency message to generate a value B;

comparing B to V; and if B equals V, replacing the public key of the first public key-private key pair with the replacement key.

11. An apparatus for recovering from a compromise of a root key, said root key being a private key of a private key-public key pair, said apparatus comprising:

a digital processor;

a communication interface connected to said digital processor and through which an emergency message is electronically received, said emergency message indicating that the root key has been compromised, said message also containing a replacement key and a digital signature which was generated by using the compromised root key;

memory storing the public key corresponding to the root key; and an input device through which a value V is entered into the digital processor, wherein V is obtained through an out-of-band channel and was generated by applying an algorithm to at least some part of the emergency message, wherein said digital processor is programmed to use the public key corresponding to the root key to verify the digital signature of the emergency message;

wherein said digital processor is programmed to apply the algorithm to said at least some part of the emergency message to generate a value B;

wherein said digital processor is programmed to compare B to V; and wherein said digital processor is programmed to replace the public key which corresponds to the root key with the replacement key, if B equals V.

12. A computer-readable medium storing a computer program which is executable on a computer including a memory, the computer program for recovering from a compromise of a root key, the root key being a private key of a private key-public key pair, said stored program comprising:

computer readable instructions which cause said computer to retrieve an emergency message from memory, said emergency message indicating that the root key has been compromised, said message also containing a replacement key and a digital signature which was generated by using the compromised root key;

computer readable instructions which cause said computer to use the public key corresponding to the root key to verify the digital signature of the emergency message;

computer readable instructions which cause said computer to apply the algorithm to said at least some part of the emergency message to generate a value B;

computer readable instructions which cause said computer to compare B to V; and computer readable instructions which cause said computer to replace the public key which corresponds to the root key with the replacement key, if B equals V.

* * * * *